United States Patent
Cooperman et al.

(10) Patent No.: US 8,099,464 B2
(45) Date of Patent: *Jan. 17, 2012

(54) METHOD AND APPARATUS FOR PROVIDING AN INSTANT MESSAGE NOTIFICATION

(75) Inventors: Hillel N Cooperman, Sammamish, WA (US); Stephen P Proteau, Bothell, WA (US); Mark R Ligameri, Everett, WA (US); Austina M De Bonte, Woodinville, WA (US); Kathleen B McNamee, St Clair, MI (US); Cornelis K Van Dok, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1601 days.

This patent is subject to a terminal disclaimer.

(21) Appl. No.: 11/054,036

(22) Filed: Feb. 8, 2005

(65) Prior Publication Data

US 2005/0223069 A1 Oct. 6, 2005

Related U.S. Application Data

(63) Continuation of application No. 09/845,733, filed on Apr. 30, 2001, now Pat. No. 6,907,447.

(51) Int. Cl.
*G06F 15/16* (2006.01)
(52) U.S. Cl. ......... 709/206; 709/207; 709/204; 709/203
(58) Field of Classification Search .................. 715/808, 715/772, 790, 814, 864, 273, 753, 781; 345/592; 709/206, 205, 203
See application file for complete search history.

(56) References Cited

U.S. PATENT DOCUMENTS

| | | | |
|---|---|---|---|
| 6,292,769 B1* | 9/2001 | Flanagan et al. | 704/3 |
| 6,353,451 B1* | 3/2002 | Teibel et al. | 715/803 |
| 6,691,162 B1* | 2/2004 | Wick | 709/224 |
| 6,871,214 B2* | 3/2005 | Parsons et al. | 709/206 |
| 7,168,048 B1* | 1/2007 | Goossen et al. | 715/797 |
| 7,224,774 B1* | 5/2007 | Brown et al. | 379/88.14 |
| 2002/0080184 A1* | 6/2002 | Wishoff | 345/800 |
| 2002/0151283 A1* | 10/2002 | Pallakoff | 455/90 |
| 2005/0229114 A1* | 10/2005 | Wilson et al. | 715/837 |
| 2007/0192410 A1* | 8/2007 | Liversidge et al. | 709/204 |
| 2007/0208865 A1* | 9/2007 | Morris et al. | 709/228 |
| 2008/0065723 A1* | 3/2008 | Corboy et al. | 709/203 |

OTHER PUBLICATIONS

Griffiths "MSN Messenger Service Vs. ICQ" Nov. 20, 2000, pp. 1-3.*
"What is AOL Instant Messenger" Jun. 24, 1999 p. 1-17.*

(Continued)

*Primary Examiner* — Karen Tang
(74) *Attorney, Agent, or Firm* — Shook Hardy & Bacon LLP

(57) ABSTRACT

An instant messaging client application is provided that receives requests to initiate instant messaging conversations and, in response to the requests, displays a notification window. The notification window includes information that may allow a user to decide whether or not the user would like to participate in the instant messaging conversation. The notification window is displayed gradually and removed gradually. The notification window contains an indication that another instant messaging user would like to initiate an instant messaging conversation and may include an identification of the remote user. The notification window also contains a description of the topic for the requested instant messaging conversation. The instant messaging client application may also display a notification window each time an instant message is received from a remote user and the application window is in a non-visible or non-active window.

12 Claims, 14 Drawing Sheets

OTHER PUBLICATIONS

Epinions "Microsoft MSN Messenger Service" Mar. 9, 2000 p. 1-2.*
Angwin, Julia, "Instant Messaging Services at AOL Quietly Linked," *The Wall Street Journal*, Sep. 26, 2000, p. B1, col. 5, p. B4, col. 3.
Derfler, Frank J., Jr., "Chat Goes to Work," *PC Magazine 19*(2):82-89, Jan. 18, 2000.
Dornan, Andy, "Emerging Technology: Instant Gratification," NetworkMagazine.com [online], Aug. 5, 2000, <http://www.networkmagazine.com/article/NMG20000725S0001> [retrieved Feb. 1, 2001].
Gaskin, James E., "Instant Enterprise," *InternetWeek*, Apr. 24, 2000, pp. 55-56, 58.
"Instant Messaging Could Be Godsend for Wireless World," *Communications Today 6*(189) [online], Oct. 2, 2000 [retrieved Feb. 1, 2001], retrieved from LEXIS-NEXIS® Academic Universe.

Johnson, Dave, "Making the Most of Instant Messaging," *Ziff Davis Smart Business for the Economy* [online], Aug. 2000, <http://www.zdnet.com/smartbusinessmag/stories/all/0,6605,2598256,00.html [retrieved Feb. 1, 2001].
Marsan, Carolyn Duffy, "AOL Out of Instant Messaging Standard Bake-Off," *Network World, Inc. 17*(32):14 [online], Aug. 7, 2000 [retrieved Feb. 1, 2001], retrieved from LEXIS-NEXIS® Academic Universe.
Tapellini, Donna, "Get Your IM to Go," *Computer Shopper*, Feb. 2001, p. 191.
Vittore, Vince, "The Next Dial Tone?" *Telephony 239*(16):36-38, 40, 42, Oct. 16, 2000.

* cited by examiner

METHOD AND APPARATUS FOR PROVIDING AN INSTANT MESSAGE NOTIFICATION

CROSS-REFERENCE(S) TO RELATED APPLICATION(S)

This application is a continuation of U.S. patent application Ser. No. 09/845,733, filed Apr. 30, 2001, the benefit of the filing date of which is hereby claimed under 35 U.S.C. §120.

FIELD OF THE INVENTION

The present invention generally relates to the field of computer systems for providing real-time instant messaging. More specifically, the present invention relates to a method and apparatus for providing an instant messaging notification.

BACKGROUND OF THE INVENTION

Through the advent and proliferation of the Internet, computer users have found many new ways to communicate with one another. One of the most popular new ways for computer users to communicate with each other is through instant messaging ("IM"). IM allows two or more networked computer users to communicate in real-time. Typically, this is accomplished through the use of an IM client application installed on each user's computer. Each computer user is also assigned a unique user identification code ("user ID") that allows them to be uniquely identified from a multitude of IM users. IM client applications also typically provide "buddy lists" containing the user IDs of the people with which they most frequently engage in IM conversations.

To initiate an IM conversation, an initiating user may simply select a user ID of a user to be contacted from the buddy list provided by the IM client application. The IM client application then sends a request to initiate an IM session to an IM client application remotely executing on the computer of the user having the selected user ID. The remotely executing IM client application then provides some indication to the contacted user that the initiating user would like to engage in an IM conversation. The contacted user may accept or decline the request. If the contacted user accepts the request, an IM session is initiated and each user may type messages to the other in real time. If the contacted user declines the request, no IM session is initiated and a message is provided to the initiating user that the request has been declined. For text messages, there is no invitation to accept or decline an instant message. The sender simply selects an on-line buddy (the buddy must be on-line at the time) and can then send a message. The recipient will receive a notification that an IM conversation has started and an IM conversation window will be opened. The user can choose to ignore or respond, but the session has been established.

Previous IM client applications have had limited success thus far of allowing a user to accept or decline a request for an IM session while utilizing another application program. In particular, previous IM client applications typically do not provide any information regarding the requested IM session other than the user ID of the initiating user. This can be frustrating for the contacted user because they must respond to an IM request just to determine the topic of the requested IM session. This may be particularly frustrating for a contacted user who responds to such a request only to determine that he or she did not want to participate in an IM session having the given topic.

Previous IM client applications also do not permit users to monitor the contents of an IM session without having the IM client application window active. This can be frustrating for a user who is not actively participating in an IM session but who would like to monitor the IM session to determine if their participation is required. Moreover, previous IM client applications are only operative to receive instant messages from other IM client applications. These previous IM client applications cannot receive instant messages from business partners or other outside entities. This is a severe drawback in that previous IM client applications cannot deliver important messages from any entity other than another IM client application installed on another user computer.

Accordingly, in light of the above problems, there is a need for a method and apparatus for providing an IM notification that can provide a topic for a requested IM session. Using this information, a user may decide whether or not to participate in the IM session before actually becoming a part of the session. There is also a need for a method and apparatus for providing an IM notification that allows a user to monitor the contents of an IM session without actively participating the IM session and without having to make the IM client application window an active window. There is a further need for a method and apparatus for providing an IM notification that can receive and deliver instant messages from business partners of the IM provider and other outside entities.

SUMMARY OF THE INVENTION

The present invention solves the above problems by providing a method and apparatus for providing an IM notification that can provide a notification of a requested IM session including information like the session topic that may allow a user to decide whether or not to participate in the requested IM session. The present invention also provides a method and apparatus for providing an IM notification that allows a user to monitor the contents of an IM session without actively participating the IM session and without having to make the IM client application window active. Moreover, the present invention also advantageously provides a method and apparatus for providing an IM notification that can receive and deliver instant messages received from business partners of the IM provider.

Generally described, the present invention provides an IM client application that receives requests to initiate IM conversations and, in response to the requests, displays a notification window. The notification window includes information that may allow a user to decide whether or not the user would like to participate in the IM conversation. According to one actual embodiment of the present invention, the notification window is displayed gradually so that the notification window appears to "roll" up from the user interface desktop. Other types of animation sequences for displaying the notification window may also be used. The notification window contains an indication that another IM user would like to initiate an IM conversation and may include an identification of the remote user. The notification window also contains a description of the topic for the requested IM conversation. The topic may comprise a portion of the text typed by the remote IM user or a specifically entered topic. An image or series of images may also be provided that indicate the general topic for the conversation. Based upon this information, the contacted IM user may accept or ignore the conversation request.

In order to accept the IM conversation request, the contacted user may select the text displayed in the notification window, such as the identification of the remote user or the topic, using a mouse or other selection device. If the contacted user accepts the IM conversation request, the IM client application window is displayed and the IM session is initiated between the remote user and the contacted user. If the contacted user chooses to do nothing and ignore the IM conversation request, the notification window will remain active for a predetermined amount of time and is then gradually removed so that it appears to "roll" down. Other types of animation may also be used when removing the notification window. The contents of the notification window remain active and may be selected by the user to initiate the IM conversation until the notification window has completely been removed from the display screen. In this manner, the user may choose to respond to the IM conversation request by selecting the contents of the notification window up until the time the very last portion of the notification window is removed.

According to one actual embodiment of the present invention, a notification window is displayed each time an instant message is received from a remote user and the IM client application window is in a non-visible or non-active window. In this manner, the contacted user can monitor the contents of an IM conversation without taking the focus from the currently active application. If the contacted user desires to participate in the IM conversation, the user may select the contents of the notification window to bring the IM client application forward into an active visible window.

In yet another embodiment of the present invention, a notification window may be displayed by the IM client application in response to an instant message received from a business partner. In this embodiment of the present invention, the notification may contain a branded message from the business partner. For instance, a notification window may be displayed in response to receiving a notification from a shipping company that a package has been delivered to the user's home address. The notification window may include a branded message such as the shipping company's logo and other information. A World Wide Web ("Web" or "WWW") hyperlink may also be provided in the notification window that, when selected, directs a Web browser to an Internet Web site provided by the business partner. The business partner Web site may allow the user to change the conditions upon which instant messages are transmitted by the business partner to the user. Similarly branded instant messages may also be received by the IM client application containing stock quotes, product specials, or other information. A computer-readable medium and computer controlled apparatus are also provided for providing an instant messaging notification.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a method, computer-controlled apparatus, and computer-readable medium for providing an IM notification. Aspects of the present invention are embodied in an IM client application executing on an IM client computer connected to a distributed computing network, such as the Internet. The IM client application is operative to receive IM conversation requests, instant messages, and messages from business partners of the IM provider and to display notifications on a computer display in a variety of ways. Turning now to the figures, in which like numerals represent like elements, an actual embodiment of the present invention will be described.

Figure 1:
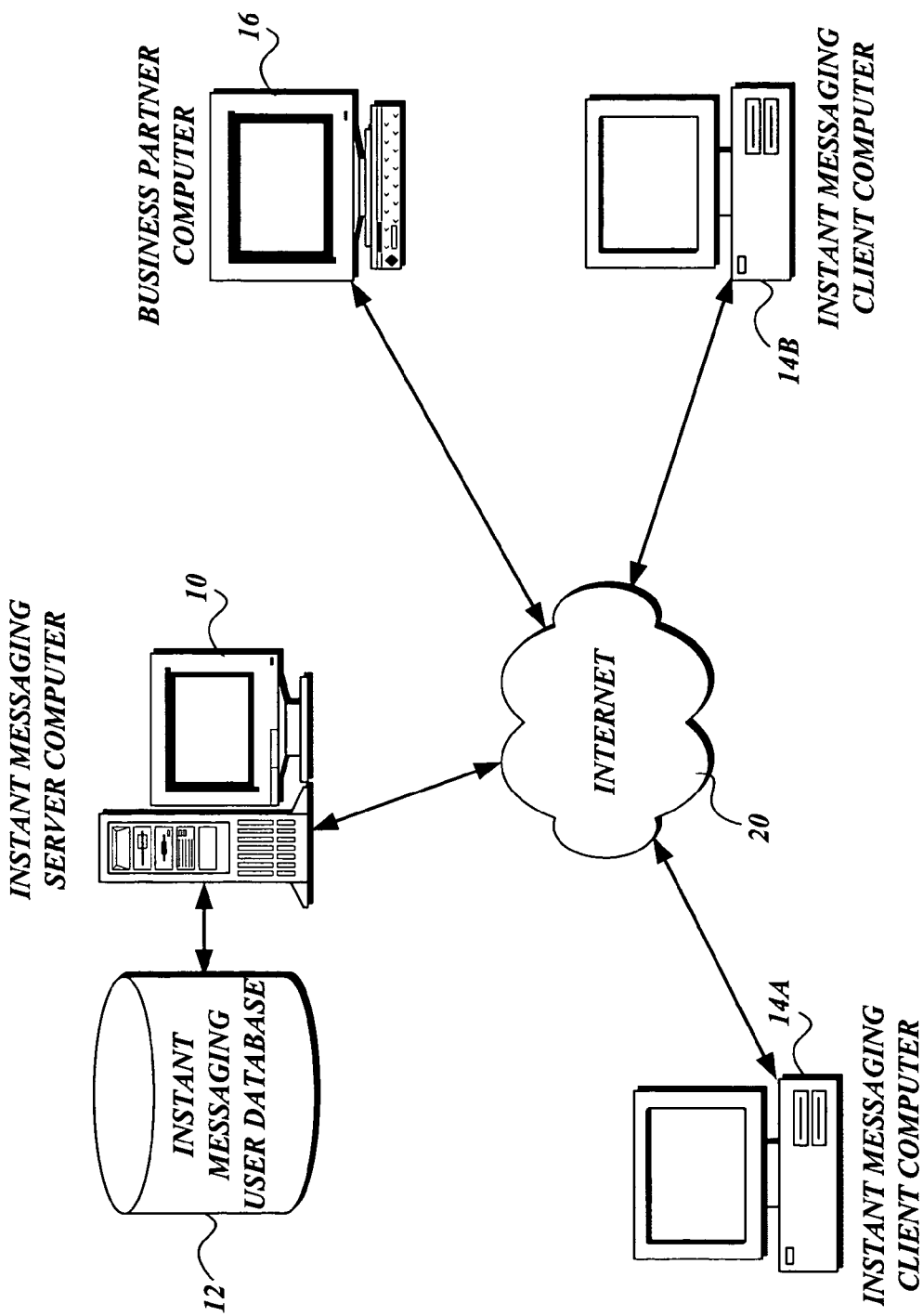
FIG. 1 is a block diagram showing an illustrative operating environment for an actual embodiment of the present invention.

Referring now to FIG. 1, an illustrative operating environment for the actual embodiment of the present invention presented herein will be described. Aspects of the present invention are implemented in an IM client application program executing on the IM client computers 14A-B. The IM client computers 14A-B communicate with each other and the IM server computer 10 over the Internet 20. As known to those skilled in the art, the Internet 20 comprises a collection of networks and routers that use the Transmission Control Protocol/Internet Protocol to communicate with one another. The Internet 20 typically includes a plurality of local area networks and wide area networks that are interconnected by routers. Routers are special purpose computers used to interface one LAN or WAN to another. Communication links within the LANs may be twisted wire pair, or coaxial cable, while communication links between networks may utilize 56

Kbps analog telephone lines, 1 Mbps digital T-1 lines, 45 Mbps T-3 lines or other communications links known to those skilled in the art. Furthermore, computers, such as the IM client computers 14A-14B and the IM server computer 10, can be remotely connected to either the LANs or the WANs via a permanent network connection or via a modem and temporary telephone link. It will be appreciated that the Internet 20 comprises a vast number of such interconnected networks, computers, and routers.

The IM server computer 10 is operative to provide an IM service to users of the IM client computers 14A-B. In particular, the IM server computer 10 is operative to maintain an IM user database 12 which comprises the identities of all IM users authorized to communicate via the IM server computer 10. The IM server computer 10 is also operative to store other information regarding the IM users, including "buddy lists", Web pages, and other contact information. The IM server computer 10 is also operative to facilitate IM conversations between two or more IM client computers 14A-14B. In particular, the IM server computer 10 is operative to receive a request from an IM client computer 14A to initiate an IM conversation with another IM client computer 14B. The IM server computer 10 is operative to transmit a request for an IM conversation to the IM client computer 14B. If a user of the IM client computer 14B accepts the IM conversation request, the IM server computer 10 is further operative to receive instant messages from each of the IM client computers 14A-14B and to transmit the messages to their destinations in approximately real time. As will be described in greater detail below, the IM server computer 10 may receive instant messages from a business partner computer 16 also connected to the Internet 20. These messages may then be transmitted to the one of the IM client computers 14A-14B. In this manner, the IM server computer 10 may facilitate IM services between the IM client computers 14A-14B and the business partner computer 16 and between the IM client computers 14A-14B. Other aspects of an IM service as provided by the IM server computer 10 should be apparent to those of ordinary skill in the art.

Figure 2:
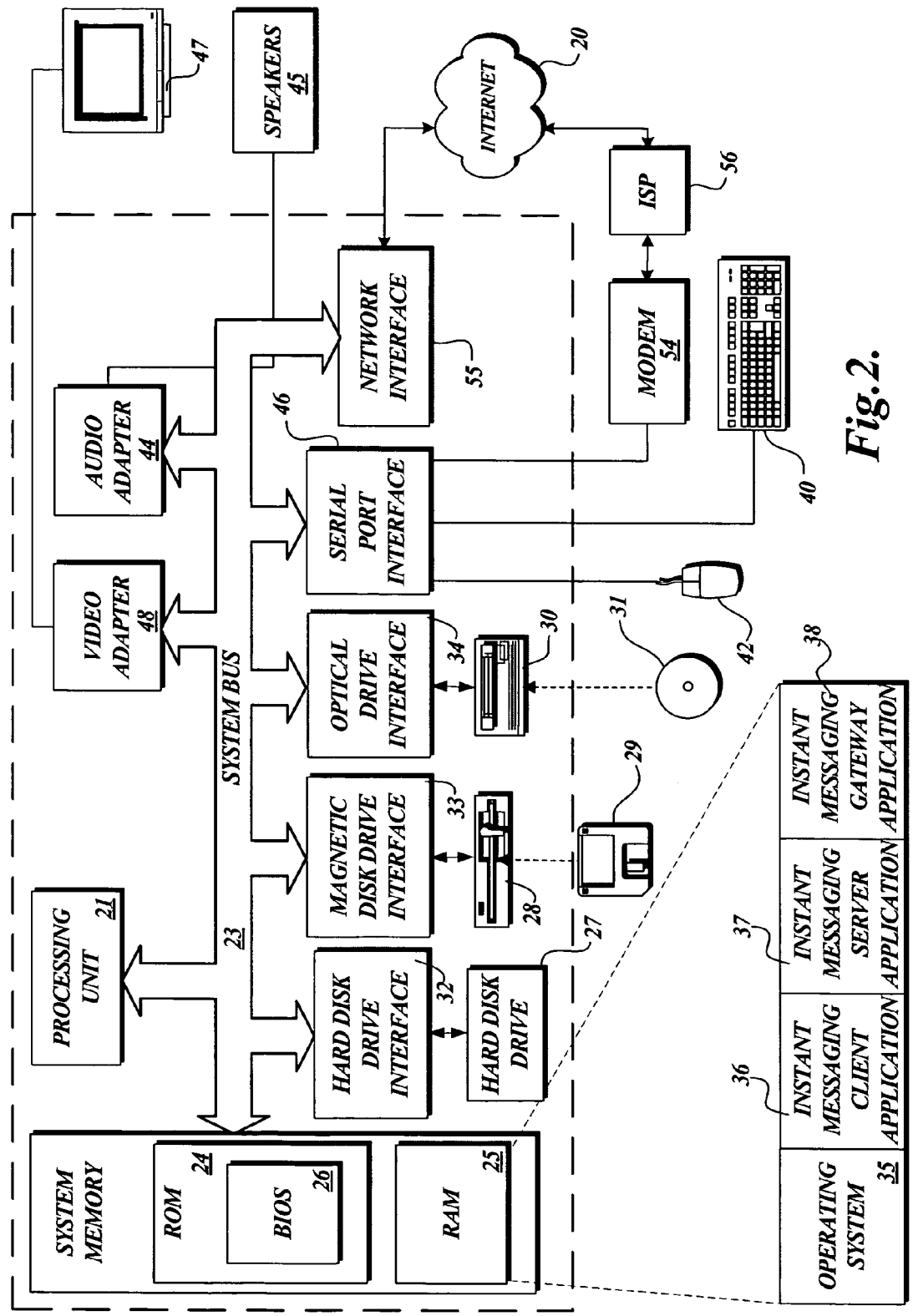
FIG. 2 is a block diagram that shows an illustrative computer architecture used for an IM client computer and an IM server computer according to an actual embodiment of the present invention.

Referring now to FIG. 2, an illustrative computer architecture for implementing aspects of the present invention will be described. The computer architecture shown in FIG. 2 may be utilized for both the IM server computer 10 and the IM client computers 14A-144B. Additionally, the computer architecture shown in FIG. 2 may also be utilized for the business partner computer 16.

The computer architecture shown in FIG. 2 illustrates a conventional computer, including a processing unit 21, a system memory 22, and a system bus 23 that couples the system memory to the processing unit 21. The system memory 22 includes a read only memory ("ROM") 24 and a random access memory ("RAM") 25. A basic input/output system 26 ("BIOS") containing the basic routines that help to transfer information between elements within the computer, such as during start-up, is stored in ROM 24. The computer further includes a hard disk drive 27, a magnetic disk drive 28, e.g., to read from or write to a removable disk 29, and an optical disk drive 30, e.g., for reading a CD-ROM disk 31 or to read from or write to other optical media such as a Digital Versatile Disk ("DVD").

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the computer. Although the description of computer-readable media above refers to a hard disk, a removable magnetic disk and a CD-ROM disk, it should be appreciated by those skilled in the art that computer-readable media can be any available media that can be accessed by the computer. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other medium which can be used to store the desired information and which can be accessed by the computer.

A user may enter commands and information into the computer shown in FIG. 2 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus ("USB"). A monitor 47 or other type of display device is also connected to the system bus 23 via an display interface, such as a video adapter 48. In addition to the monitor, a computer 20 may include other peripheral output devices, such as speakers 45 connected through an audio adapter 44 or a printer (not shown).

As described briefly above, the computer may operate in a networked environment using logical connections to one or more remote computers through the Internet 20. The computer may connect to the Internet 20 through a network interface 55. Alternatively, the computer may include a modem 54 and use an Internet Service Provider ("ISP") 56 to establish communications with the Internet 20. The modem 54, which may be internal or external, is connected to the system bus 23 via the serial port interface 46. It will be appreciated that the network connections shown are illustrative and other means of establishing a communications link between the computer and the Internet 20 may be used.

A number of program modules may be stored in the drives and RAM 25, including an operating system 35, such as Windows ME® or Windows 2000® from Microsoft® Corporation. When the computer architecture shown in FIG. 2 is utilized to implement an IM client computer 14A-14B, the drives and RAM 25 may also store an IM client application 36. The IM client application 36 is operative to communicate with the IM server computer 10 to provide IM functionality, including IM notifications. The IM client application 36 will be described in greater detail below with respect to FIGS. 3-12.

When the computer architecture shown in FIG. 2 is utilized to implement an IM server computer 10, the drives and RAM 25 may also store an IM server application 37. The IM server application 37 is responsible for providing an IM service between two or more IM client computers 14A-14B. Details regarding the operation of the IM server application 37 are known to those of ordinary skill in the art. The drives and RAM 25 of an IM server computer 10 and a business partner computer 16 may also store an IM gateway application 38. The IM gateway application 38 provides an interface to the IM server application 37 to the business partner computer 16. In this manner, the business partner computer 16 may transmit instant messages destined for an IM client computer 14A.

Additional details regarding the operation of the IM gateway application 38 will be described below with respect to FIGS. 13A-13D.

Figure 3:
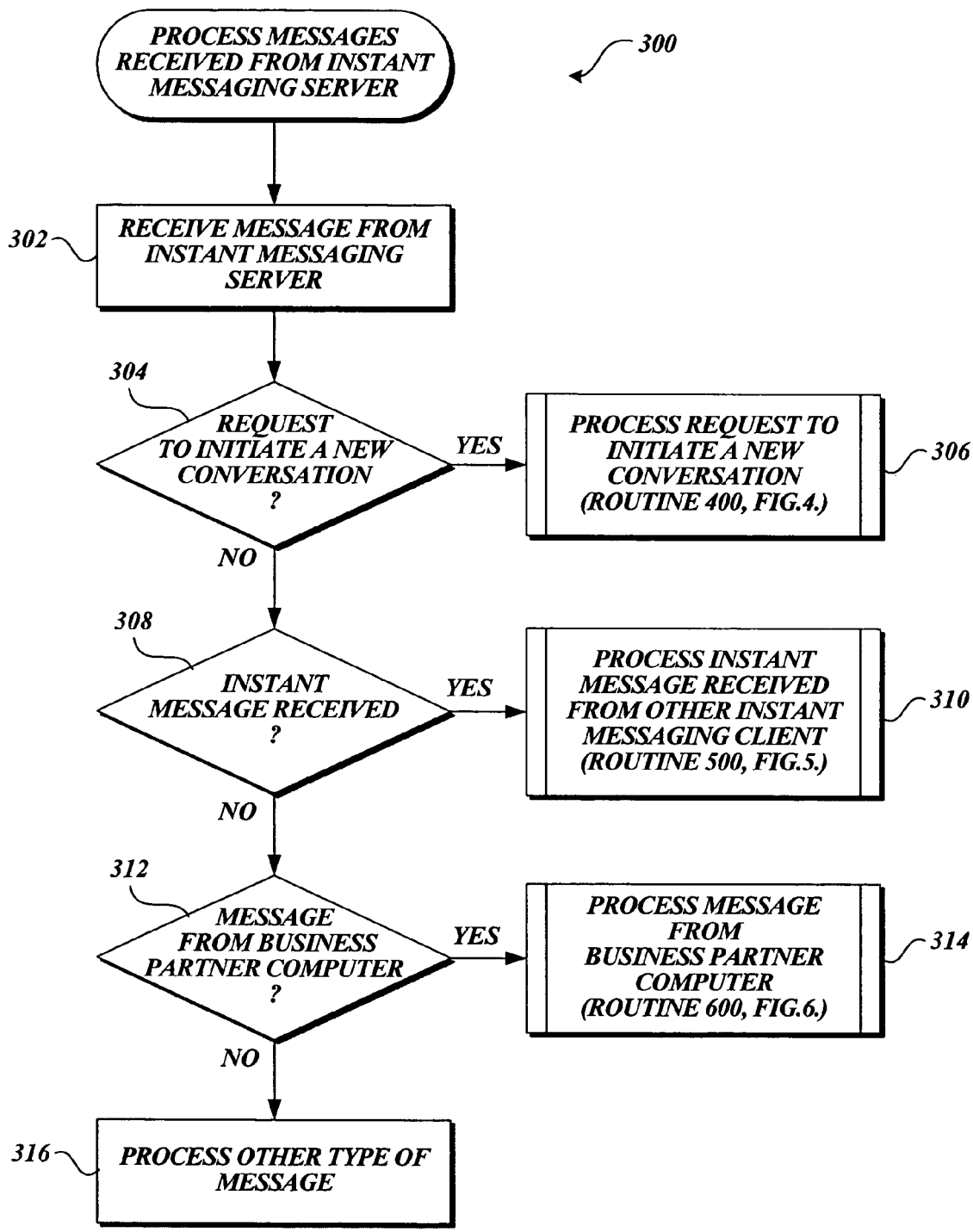
FIG. 3 is a flow diagram showing an illustrative routine for processing messages received from an IM server according to an actual embodiment of the present invention.

Referring now to FIG. 3, an illustrative routine 300 for processing messages received from an IM server computer will be described. As mentioned briefly above, an IM server computer may generate messages to an IM client application, including requests to initiate a new IM conversation, instant messages themselves, and messages from a business partner computer. The routine 300 begins at block 302, where a message is received at an IM client application from the IM server computer. The routine 300 continues from block 302 to block 304, where a determination is made as to whether the message comprises a request to initiate a new IM conversation. If the message comprises a request to initiate a new IM conversation, the routine 300 branches to block 306. At block 306, the request to initiate a new IM conversation is processed. An illustrative routine 400 for processing request to initiate a new IM conversation is described below with reference to FIG. 4. From block 306, the routine 300 returns to block 302, where additional messages received from the IM server computer are processed.

If, at block 304, it is determined that the message does not comprise a request to initiate a new IM conversation, the routine 300 continues to block 308. At block 308, a determination is made as to whether the received message comprises an instant message, such as chat text typed by one IM user into an IM client application. If the message comprises an instant message received from another IM client application, the routine 300 branches to block 310. At block 310, the instant message received from the other IM client application is processed. An illustrative routine 500 for processing instant messages is described below with reference to FIG. 5. Once the instant message has been processed, the routine 300 continues from block 310 to block 302, where additional messages are processed.

If, at block 308, it is determined that the message does not comprise an instant message received from another IM client application, the routine 300 continues from block 308 to block 312. At block 312, a determination is made as to whether the received message comprises a message from a business partner computer. If such a message is received, the routine 300 branches to block 314 where the message received from the business partner computer is processed. An illustrative routine 600 for processing messages received from a business partner computer is described below with reference to FIG. 6. Once the message received from the business partner computer has been processed, the routine 300 continues from block 314 to block 302 where additional messages are received.

If, at block 312, it is determined that the received message does not comprise a message received from a business partner computer, the routine 300 continues from block 312 to block 316. At block 316, messages other than requests to initiate a new IM conversation, instant messages, or messages received from business partner computers are processed. Once other types of messages have been processed at block 316, the routine 300 returns to block 302 where additional messages may be processed.

Figure 4:
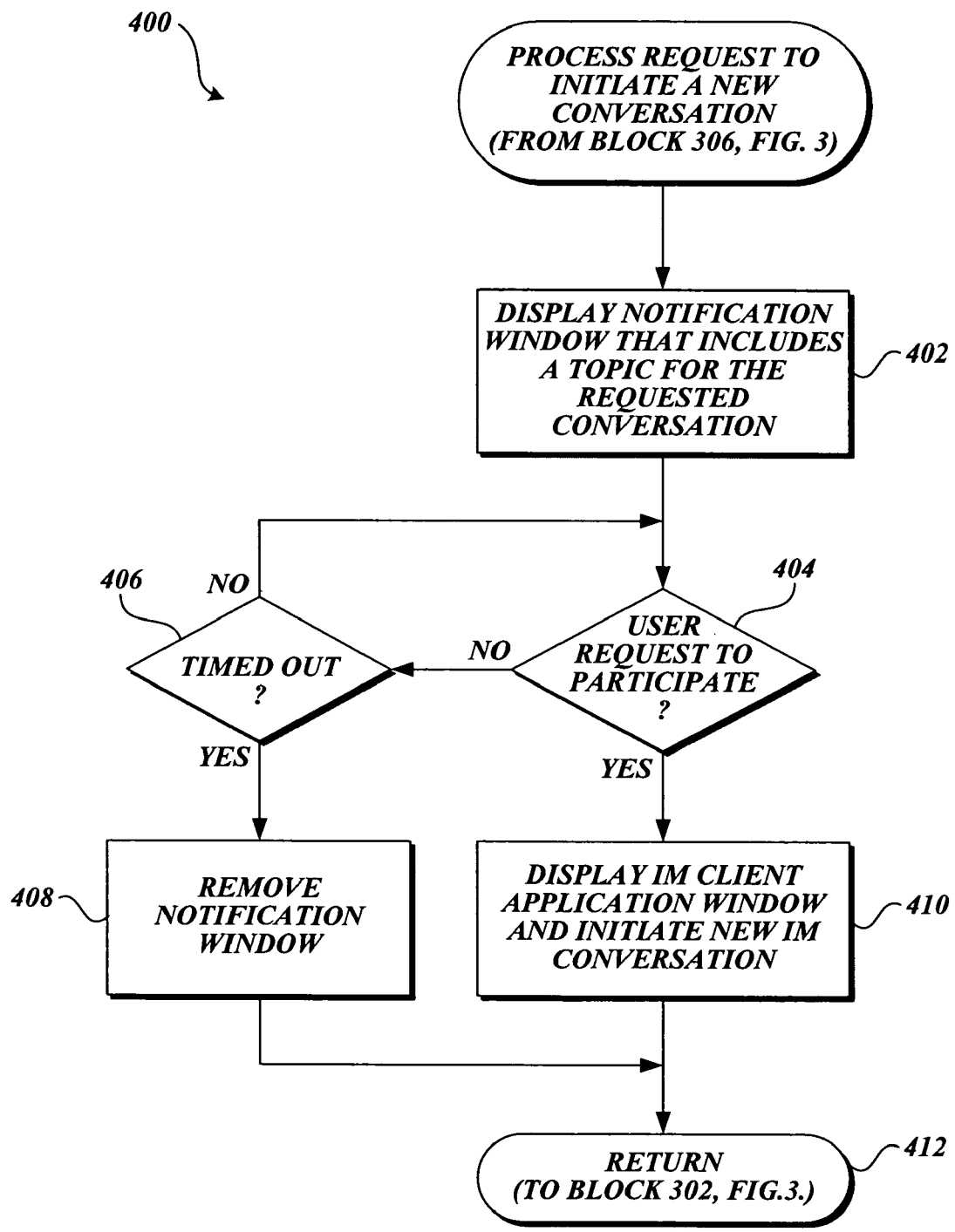
FIG. 4 is a flow diagram showing an illustrative routine for processing requests to initiate a new IM conversation according to an actual embodiment of the present invention.

Turning now to FIG. 4, an illustrative routine 400 for processing a request to initiate a new IM conversation will be described. The routine 400 begins at block 402, where a notification window is displayed that includes a topic for the requested IM conversation. The topic may also be illustrated in textual or graphical form. According to an embodiment of the invention, the notification window also includes the identification of the IM user requesting the conversation. As will be described in greater detail below with reference to FIGS. 7A-7E, the notification window may be gradually displayed so that it appears to "roll" up from the user interface desktop. According to an embodiment of the invention, the notification window is gradually displayed proximate to an icon associated with the IM client application or proximate to an icon associated with the request to initiate the IM conversation. Additionally, a sound may be played when the notification window is displayed. Other types of animation sequences may also be used when displaying and removing the notification window.

From block 402, the routine 400 continues to block 404 where a determination is made as to whether a request has been received by the local user to respond to the request to initiate an IM conversation. The local user may respond to the request by selecting the contents of the notification window. If such a request has not been received, the routine 404 branches to block 406 where a determination is made as to whether a predetermined amount of time has passed since the notification window was displayed. If a predetermined amount of time has not passed, the routine 400 returns to block 404, where an additional determination is made as to whether the user has indicated that they would like to participate in the requested IM conversation. If such a request is received at block 404, the routine 400 continues to block 410. At block 410, the new IM conversation is initiated and a new IM client application window is displayed. The IM client application window provides an area in which the user may type instant messages and otherwise participate in the IM conversation. An illustrative IM client application window will be described below with reference to FIGS. 8-9.

If, at block 406, it is determined that a predetermined amount of time has lapsed since the notification window was displayed, the routine 400 continues from block 406 to block 408 where the notification window is removed. According to an embodiment of the invention, the notification window is gradually removed from the display so that it appears to "roll" down from the user interface desktop. Also, the contents of the notification window, including the identification of the IM user requesting the conversation and the topic for the requested IM conversation, continue to be active until the notification window is completely removed. In this manner, the contents of the notification window may be selected to initiate the IM conversation up until the point where the notification window is completely removed from the display. From blocks 408 and 410, the routine 400 continues to block 412, where it returns to block 302, shown in FIG. 3.

Figure 5:
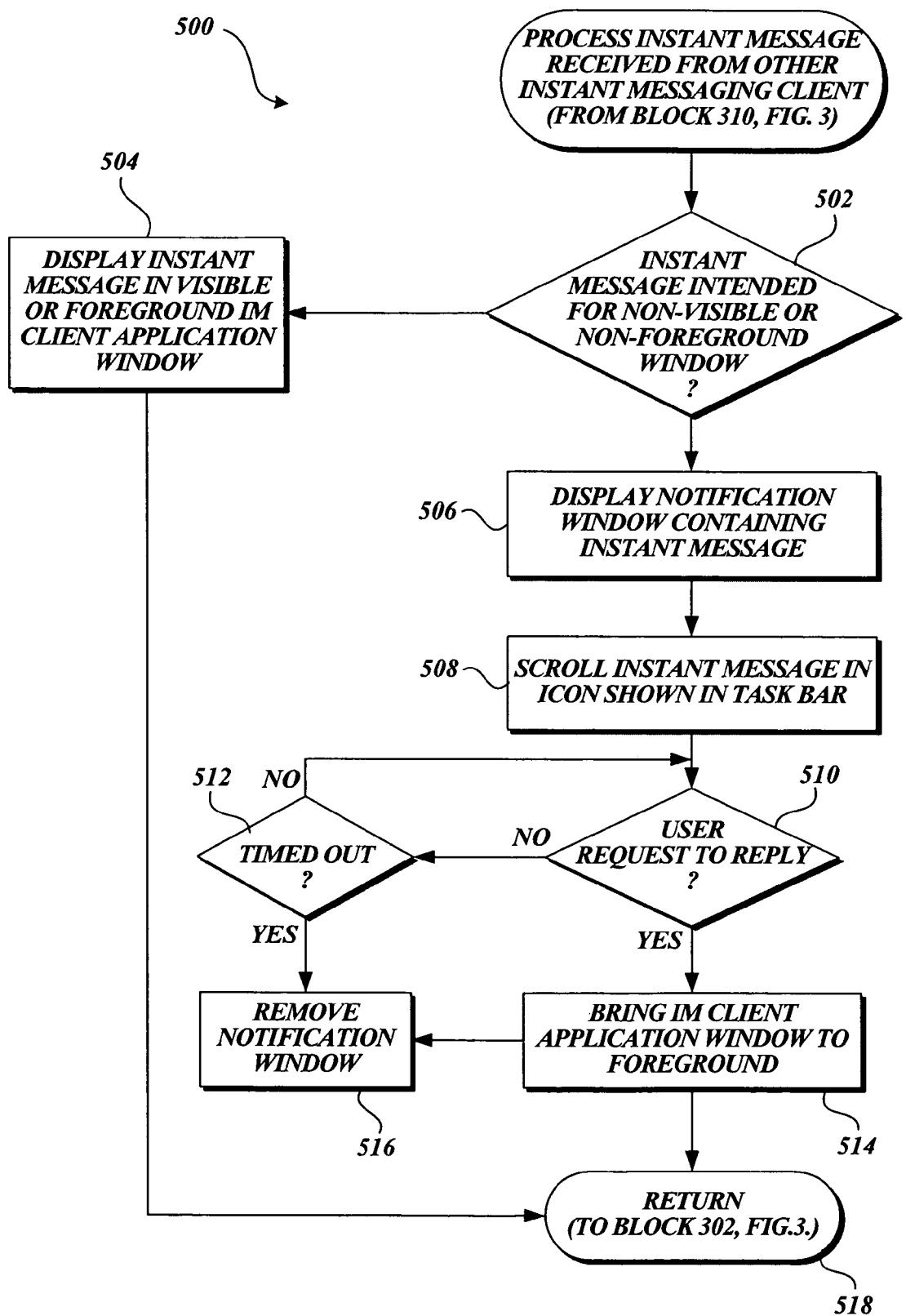
FIG. 5 is a flow diagram that shows an illustrative routine for processing chat text received from an IM client application according to an actual embodiment of the present invention.

Referring now to FIG. 5, an illustrative routine 500 will be described for processing an instant message received from another IM client application. An instant message may be received in response to a user typing text at the remote IM client application. The text is transmitted from the remote IM client application to the IM server computer and, subsequently, is received at the local user's IM client application. The routine 500 describes the processing of such instant messages according to an actual embodiment of the present invention.

The routine 500 begins at block 502, where a determination is made as to whether the received instant message is intended for an IM client application window that is either non-visible or not in the foreground of all displayed windows. If the IM client application window is visible or in the foreground, the routine 500 branches to block 504 where the received instant message is displayed in the IM client application window. From block 504, the routine 500 continues to block 518 where it returns to block 302, shown in FIG. 3.

If, at block 502, it is determined that the received instant message is intended for a non-visible or non-foreground IM client application window, the routine 500 continues to block 506. At block 506, a notification window containing the instant message is displayed. According to one embodiment of the present invention, the notification window includes an identification of the IM user that transmitted the received instant message. Moreover, the notification window may be gradually displayed so that it appears to "roll" up on the user interface desktop. The notification window may also be displayed proximate to an icon associated with the IM client application or proximate to an icon associated with the IM user that transmitted the instant message. From block 506, the routine 500 continues to block 508, where the received instant message is scrolled in the icon associated with the IM user that transmitted the instant message. According to an embodiment of the invention, the icon associated with the IM user transmitting the instant message is shown in a "task bar" located proximate to an edge of the display screen. By scrolling the received instant message in such an icon, a quick view of the instant message may be provided to the local user.

From block 508, the routine 500 continues to block 510 where a determination is made as to whether the user has made a request to reply to the instant message. According to an embodiment of the invention, such a request may be made by selecting the contents of the displayed notification window. In particular, the user may select the instant message or the name of the user transmitting the instant message using a mouse or another selection device to indicate that they would like to respond to the instant message. If such a request is not received at block 510, the routine 500 branches to block 512 where a determination is made as to whether a predetermined amount of time has lapsed since the notification window was displayed. If a predetermined amount of time has not lapsed, the routine 500 branches from block 512 to 510, where another determination is made as to whether a request to reply to the instant message has been received. If, at block 512, it is determined that a predetermined amount of time has passed since the notification window was displayed, the routine 500 branches to block 516, where the notification window is removed. According to one actual embodiment of the invention, the notification window is removed gradually, so that it appears to "roll" down from the area in which it was initially displayed on the user interface desktop. From block 516, the routine 500 continues to block 518, where it returns.

If, at block 510, it is determined that a request has received a reply to the instant message, the routine 500 continues to block 514. At block 514, the IM client application window is brought to the foreground of all displayed windows so that the user may type a response to the instant message. From block 514, the routine 500 continues to block 516 where the notification window is removed, and subsequently to block 518 where it returns to block 302, shown in FIG. 3.

Figure 6:
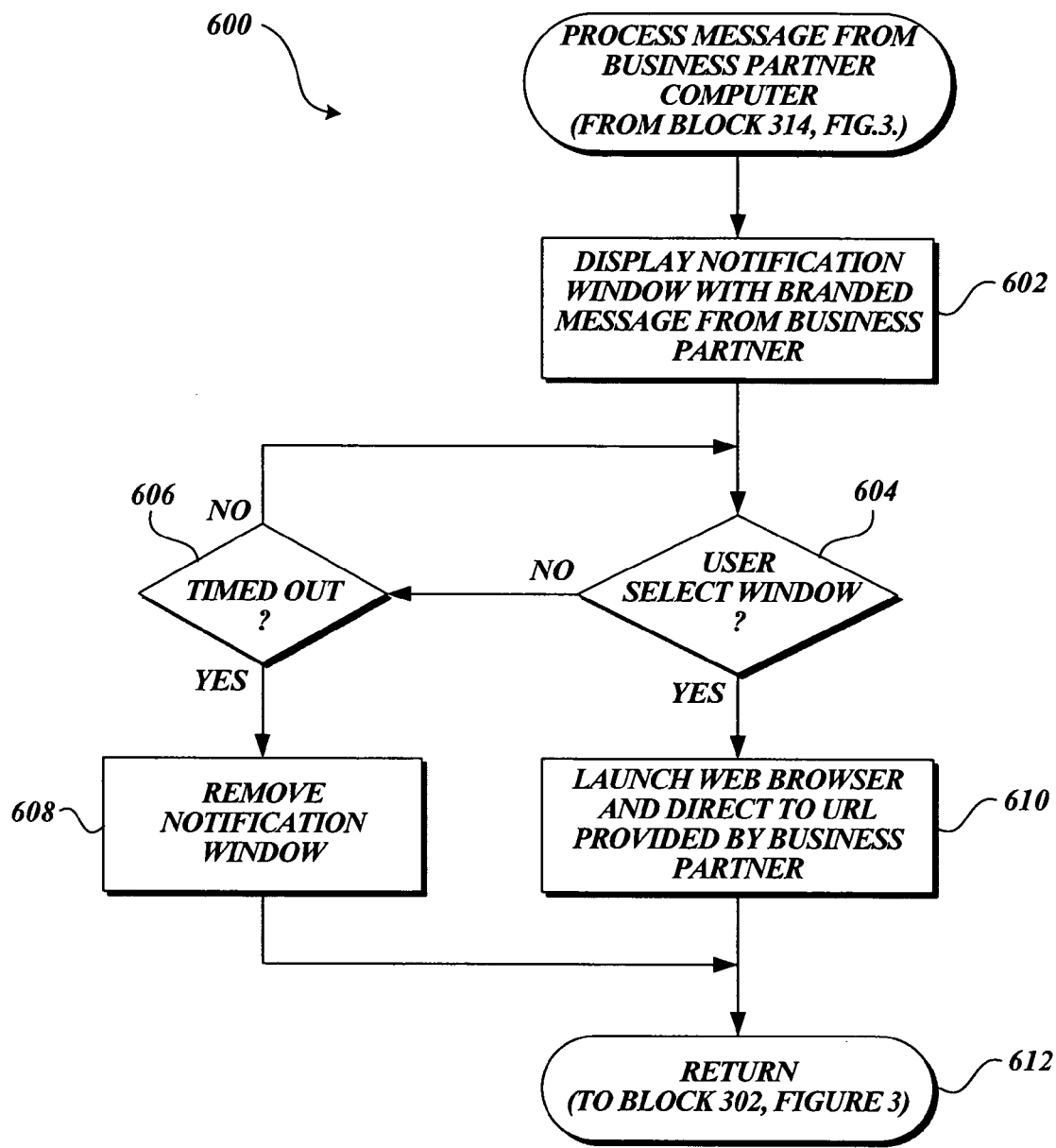
FIG. 6 is a flow diagram showing an illustrative routine for processing instant messages received from a business partner computer according to an actual embodiment of the present invention.

Turning now to FIG. 6, an illustrative routine 600 will be described for processing instant messages received from a business partner computer. As mentioned briefly above, an IM gateway application may be provided at the IM server computer that allows a business partner to transmit instant messages intended for IM client applications. The routine 600 describes functionality for processing and displaying such instant messages received from business partners of the provider of the IM service.

The routine 600 begins at block 602, where a notification window is displayed containing a branded message received from the business partner. As will be described in greater detail below with reference to FIGS. 13A-13D, the branded message may include a logo of the business partner, additional information regarding a product or service offered by that business partner, and a hyperlink to a Web site provided by the business partner. According to one actual embodiment of the present invention, the notification window is gradually displayed so that it appears to "roll" up from a portion of the display screen. Additionally, the notification window may be displayed proximate to an icon associated with the IM client application. From block 602, the routine 600 continues to block 604.

At block 604, a determination is made as to whether a selection of the notification window has been made by the user. If such a selection is not made by the user, the routine 600 branches to block 606, where a determination is made as to whether a predetermined amount of time has elapsed since the notification window was displayed. If a predetermined amount of time has not elapsed, the routine 606 branches back to block 604, where an additional determination is made as to whether the notification window has been selected. If, at block 606, it is determined that a predetermined amount of time has elapsed, the routine 600 continues to block 608, where the notification window is removed. According to one actual embodiment of the invention, the notification window is gradually removed so that it appears to "roll" down into the display screen. The routine 600 then continues from block 608 to block 612, where it returns to block 302, shown in FIG. 3.

If, at block 604, it is determined that a selection has been made of the notification window, the routine 600 continues to block 610. At block 610, a Web browser installed on the IM client computer is launched and is directed to a uniform resource locator provided by the business partner. According to one actual embodiment of the present invention, the uniform resource locator directs the Web browser to an Internet Web site provided by the business partner. In this manner, additional information may be retrieved regarding the instant message from the business partner. The notification window is also gradually removed. From block 610, the routine 600 continues to block 612, where it returns to block 302.

Figure 7A:
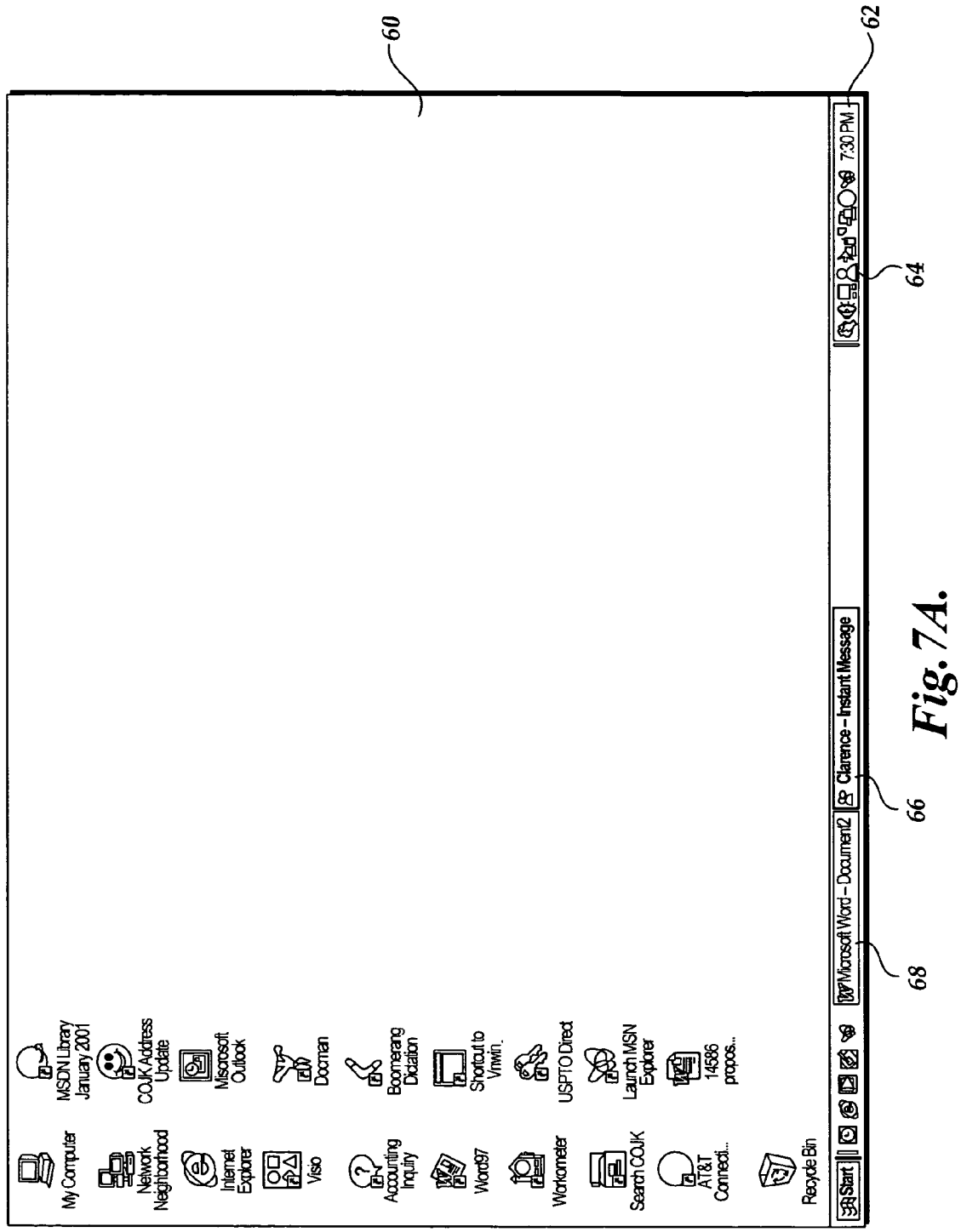
FIGS. 7A-7E are screen diagrams showing illustrative screen displays for providing an instant message notification according to an actual embodiment of the present invention.

Turning now to FIGS. 7A-7E, an illustrative user interface will be described for providing a notification that a request to initiate an IM conversation has been received. As described briefly above, the Microsoft Windows ME® or Windows 2000® operating systems provide an operating environment for an actual embodiment of the present invention. As shown in FIG. 7A, a desktop 60 is provided upon which icons or windows corresponding to executing application programs may be displayed. Additionally, a task bar 62 is provided which contains icons corresponding to currently executing applications and to applications which may be launched from the task bar 62. According to one actual embodiment of the present invention, an icon 64 associated with the IM client application is provided. By selecting the icon 64, a user may launch the IM client application or respond to a request to initiate an IM conversation. When a request to initiate an IM conversation is received, an icon 66 associated with the request to initiate an IM conversation is also displayed. If a selection is made of the icon 66, an IM client application window is launched in which a user may type instant messages. As shown in FIG. 7A, an icon 68 associated with another type of application may also be displayed in the task bar 62.

Figure 7B:
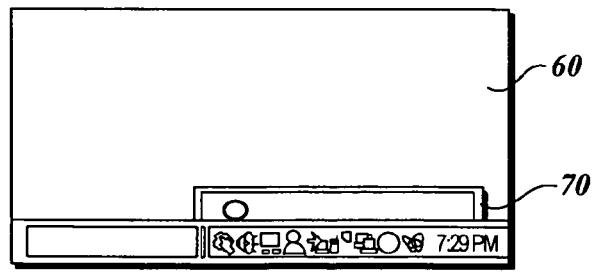
Figure 7C:
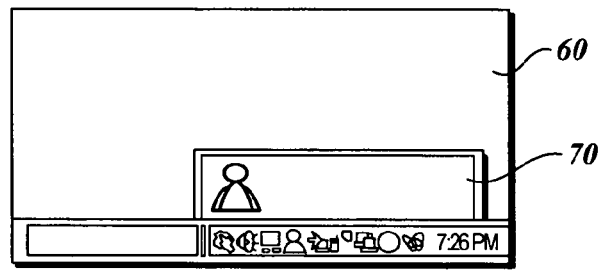
Figure 7D:
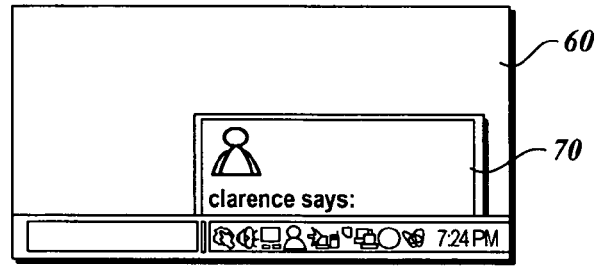
Figure 7E:
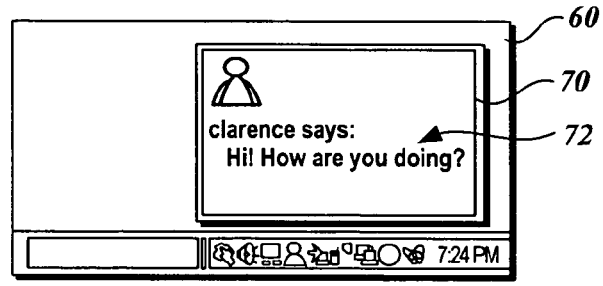

As described above, when a notification window is displayed, it is displayed gradually so that it appears to "roll" up from a portion of the desktop 60. FIGS. 7B-7E show an animation sequence for gradually displaying a notification window 70 in this manner. FIG. 7B shows the first portion of the notification window 70 being displayed proximate to the icon associated with the IM client application. FIG. 7C shows an additional portion of the notification window 70 being displayed. FIG. 7D shows yet an additional portion of the notification window 70 being displayed including the identity of the IM user requesting the IM conversation. Finally, FIG. 7E shows the notification window 70 being completely displayed including the identity of the IM user associated with the request to initiate an IM conversation and the topic 72 for the IM conversation. By gradually displaying the notification 70 in the manner illustrated in FIG. 7B-7E, the notification is provided to a user in a subtle manner that is unlikely to distract a user from work on another application program. Similarly, the notification window is gradually removed from the display screen in the reverse order that it was displayed. In this manner, the notification window will appear to "roll" down into the desktop 60. Other types of animation sequences may also be utilized when displaying and removing the notification window.

Figure 8:
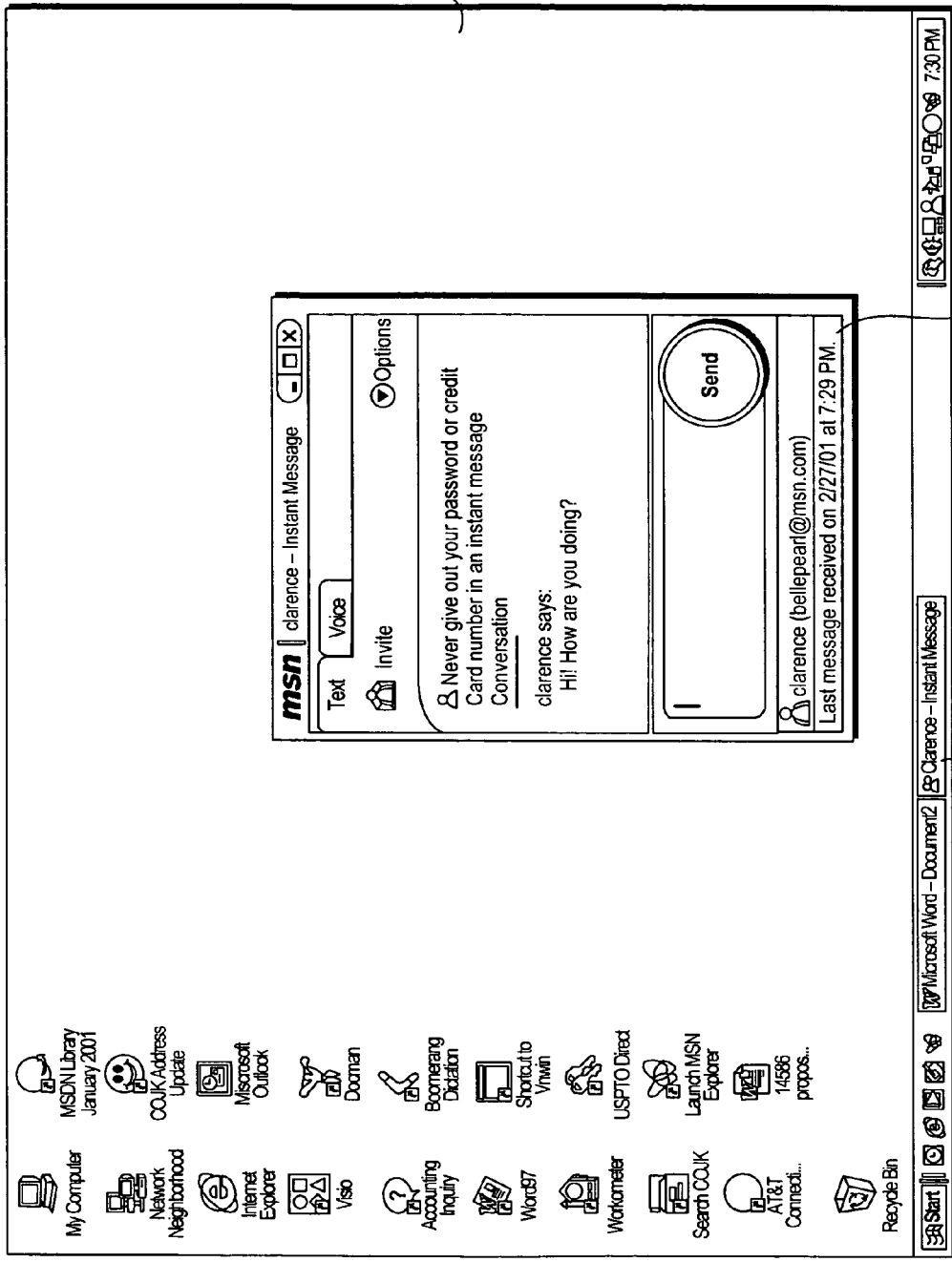
FIG. 8 is a screen diagram showing an illustrative screen display including an IM chat window according to an actual embodiment of the present invention.
Figure 9:
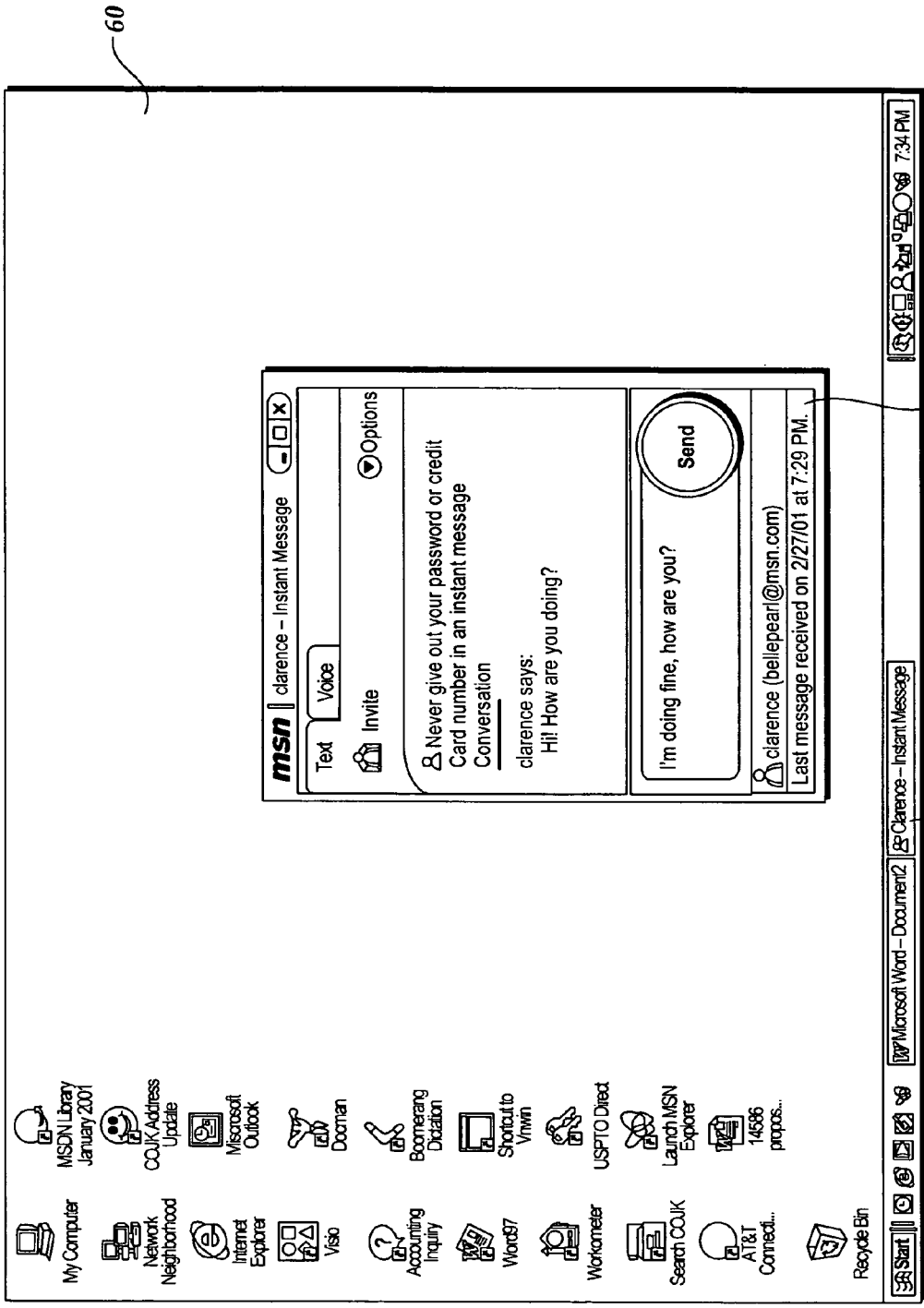
FIG. 9 is a screen diagram showing an illustrative screen display including an IM chat window according to an actual embodiment of the present invention.

Turning now to FIGS. 8 and 9, an illustrative IM client application window 74 will be described. As mentioned briefly above, if a user selects any portion of the notification window 70 while any portion of the window is displayed, an IM client application window 74 is displayed and the IM conversation is initiated. As known to those skilled in the art, a typical IM client application window provides a field in which a user may type an instant message directed to another user. The IM client application window 74 also typically includes a separate portion of the window for displaying instant messages received from the other user. The IM client application window 74 may also include other information such as a date and time when a last message was received from the other IM user.

As shown in FIG. 8, the remote user "Clarence" has transmitted an instant message saying "Hi! How are you doing?" As shown in FIG. 9, the local user has transmitted an instant message in response comprising the text "I am doing fine. How are you?" When the local user selects the "send" button located on the IM client application window 74, the typed message will be transmitted to the remote IM user. Other aspects regarding the operation of a typical IM client application window 74 should be apparent to those of ordinary skill in the art.

Figure 10:
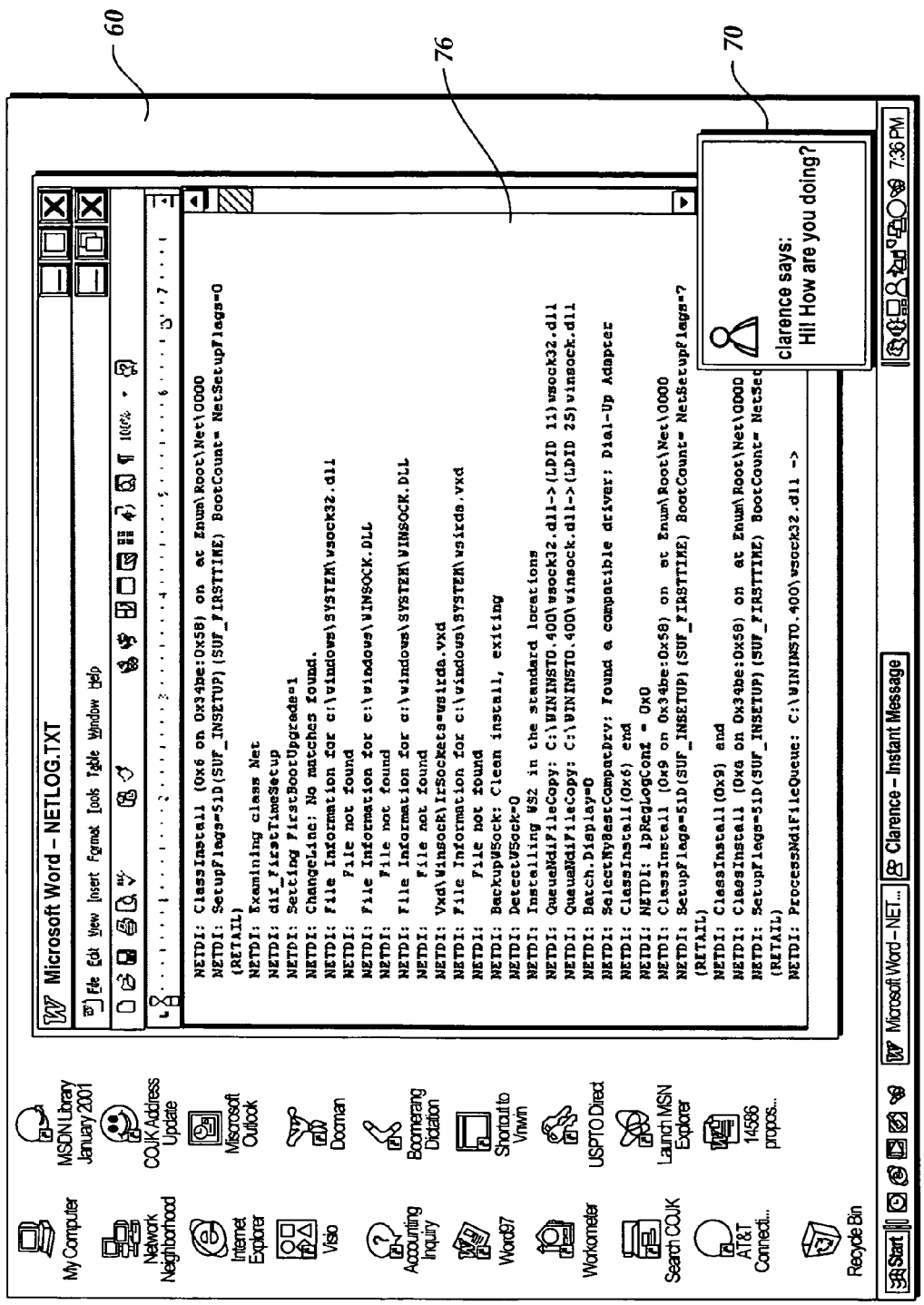
FIG. 10 is a screen diagram showing an illustrative screen display for providing an IM notification when a window other than the IM chat window is the active window according to an actual embodiment of the present invention.
Figure 11:
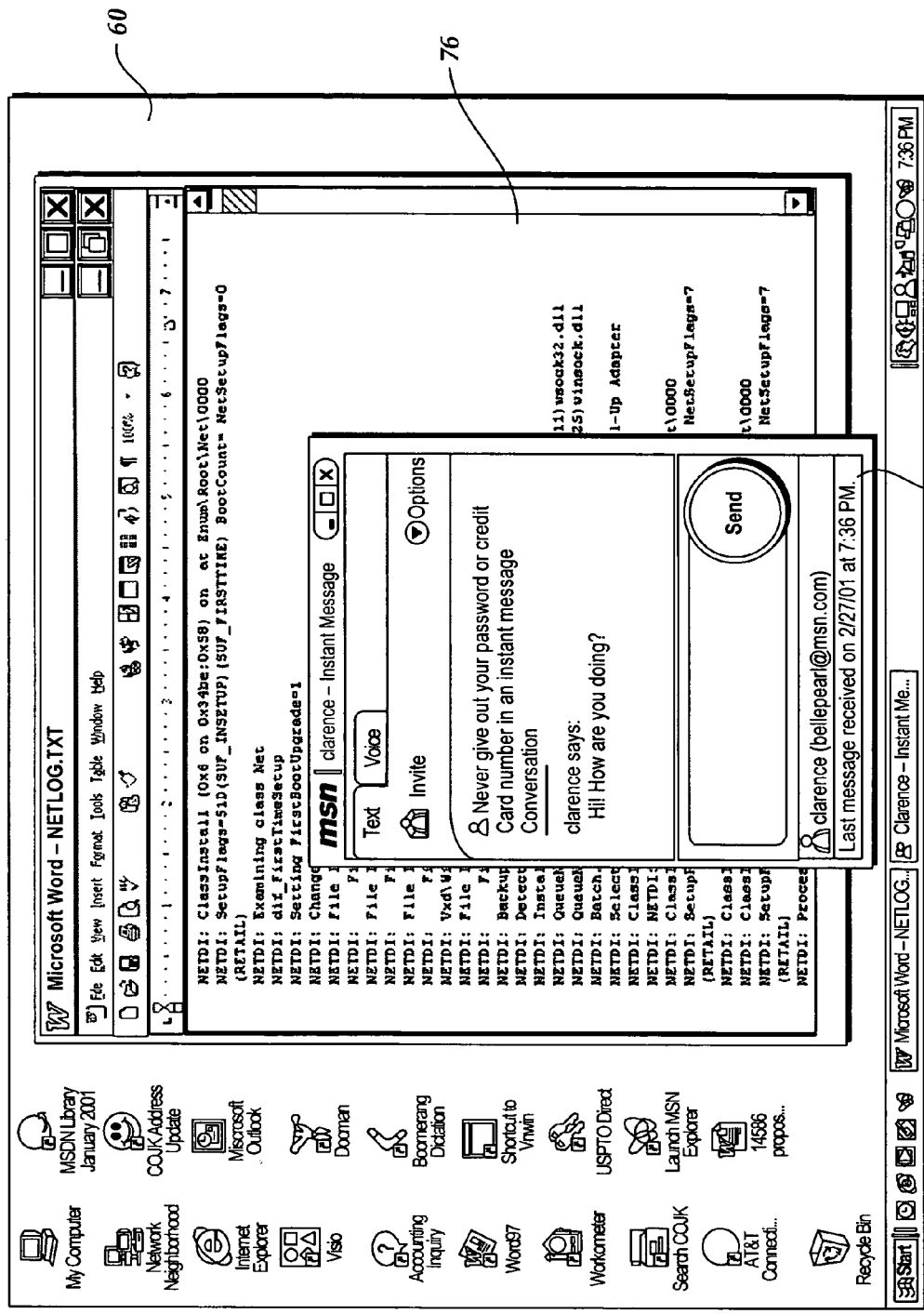
FIG. 11 is a screen diagram showing an illustrative screen display for providing an IM notification when a window other than the IM chat window is the active window according to an actual embodiment of the present invention.

Turning now to FIGS. 10 and 11, additional aspects of the present invention for providing a notification that an instant message has been received will be described. As mentioned briefly above, the notification window 70 will be displayed when a request to initiate an IM conversation is received. Additionally, a notification window 70 may be displayed when an instant message is received and the IM client application window is in a non-visible or a non-foreground state. This may occur when an application window 70 is the active window and obscures either all or a portion of the IM client application window. In such a situation, a user may select the contents of the notification window 70 or the icon associated with the instant message located in the task bar to respond to the instant message. In response to such a selection, the IM client application window 74 is brought to the foreground as shown in FIG. 11. In this manner, a user may select a notification window to respond to an instant message. Alternatively, the user may choose to ignore the notification window 70 and continue working in the application window 76. This feature is advantageous for a user that would like to monitor the contents of an IM conversation without actively participating in the conversation and also work in the application window 76 at the same time.

Figure 12:
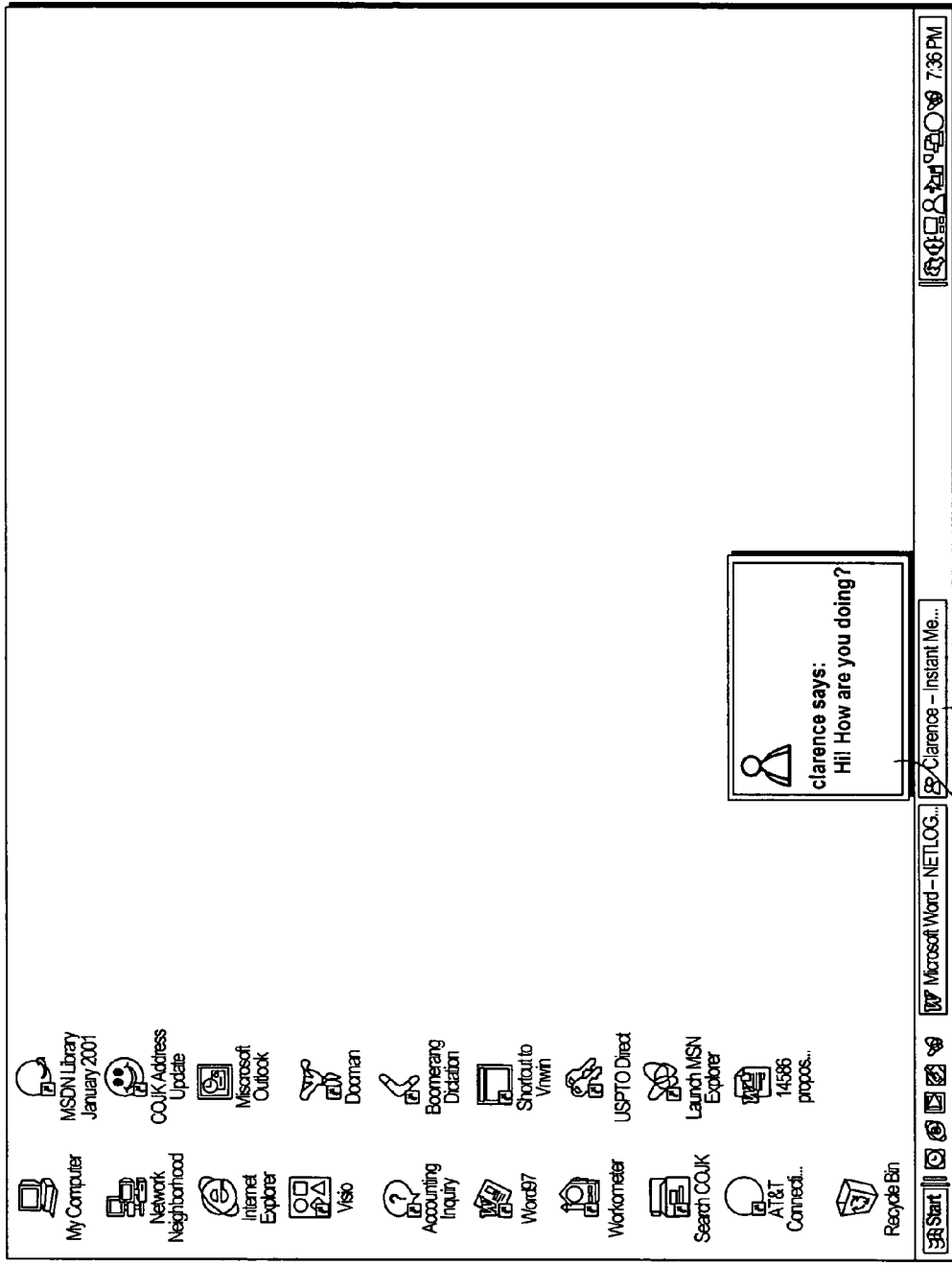
FIG. 12 is a screen diagram showing an illustrative screen display for providing an instant message notification according to an actual embodiment of the present invention.

Turning now to FIG. 12, additional aspects of the present invention for providing a notification that an instant message has been received will be described. As mentioned above, the notification window 70 may be displayed proximate to an icon associated with the IM client application and the task bar. According to one actual embodiment of the invention, the notification window 70 may also be displayed proximate to the icon 66 associated with the request to initiate an IM conversation. The notification window 70 may also be displayed proximate to an icon displayed in the task bar associated with an active IM conversation. Multiple such notification windows may be displayed corresponding to many different active IM conversations. In this manner, a user may monitor multiple IM conversations through viewing the notification window 70 without actively participating in these conversations. If the user desires to participate in one of the IM conversations, the user simply has to select the contents of the notification window 70 prior to its complete removal from the display screen. In response to such a selection, the IM client application will be displayed corresponding to the particular IM conversation, and the user will be permitted to participate. Although only one notification window 70 is shown in FIG. 12, it should be appreciated that many such windows may be concurrently displayed.

Figure 13A:
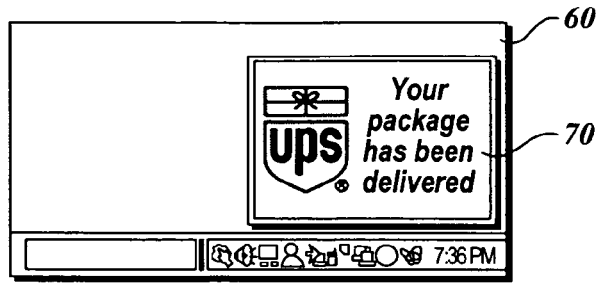
FIGS. 13A-13D are screen diagrams showing illustrative screen displays for providing an instant message notification received from a business partner computer according to an actual embodiment of the present invention.
Figure 13B:
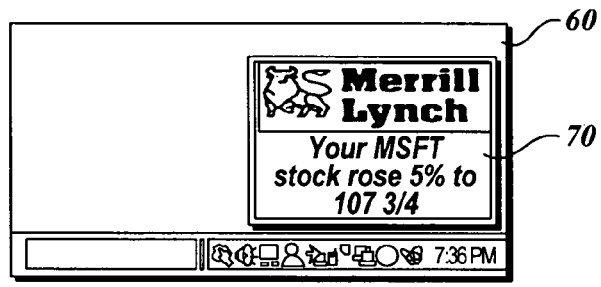
Figure 13C:
Figure 13D:
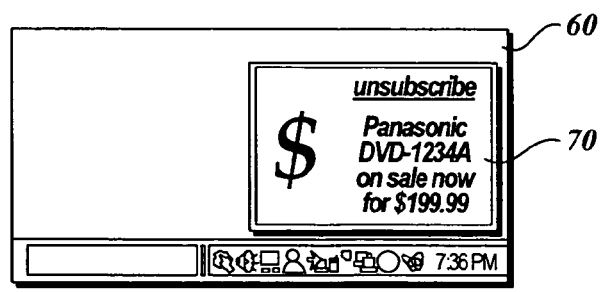

Turning now to FIGS. 13A-13D, an illustrative user interface will be described for providing a notification that an instant message has been received from a business partner computer. As mentioned briefly above, a notification window 70 may be displayed in response to receiving an instant message from a business partner computer. The notification window 70 may be gradually displayed and removed as described above. Moreover, the notification window 70 may contain an identification of a business partner associated with the instant message and additional information for the user. For instance, the notification window 70 may include an indication from a delivery company that a package has been delivered as shown in FIG. 13A. Similarly, as shown in FIG. 13B, an indication may be provided from a financial institution comprising a stock quotation. As shown in FIG. 13C, an instant message may be displayed indicating that a response has been posted on a message board or, as shown in FIG. 13D, an instant message may be provided indicating that a particular good or service is on sale.

According to one actual embodiment of the present invention, the contents of the branded notification window 70 may be selected by the user to launch a Web browser. The Web browser may be directed to a Web site at which the user can obtain additional information regarding the business partner. Moreover, the branded notification window 70 may contain a hyperlink for unsubscribing the user from the branded notification provided by the business partner. Other such similar notifications may also be provided to the user via the branded notification window 70.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Non-transitory computer readable media storing computer-executable instructions that, when executed by a computing device, perform a method for providing a notification that an instant message has been received, the method comprising:
   receiving said request the instant message (IM) by an instant messaging client application running on the computing device;
   displaying in a graphical user interface (GUI) a top portion of a notification window above a taskbar, the notification window comprising an identification of an IM user that sent the IM and at least a portion of the IM;

displaying in the GUI a middle portion of the notification window above the taskbar; and displaying in the GUI a bottom portion of the notification window above the taskbar, wherein the top portion, the middle portion, and the bottom portion are sequentially displayed in a gradual manner, and wherein the notification window rolls up from the taskbar in an animated manner.

2. The method of claim 1, wherein displaying said notification window comprises gradually displaying said notification window.

3. The method of claim 2, wherein said notification window is displayed proximate to an icon associated with the instant messaging client application.

4. The method of claim 3, wherein said icon is displayed in a task bar located along one edge of a user interface desktop.

5. The method of claim 1, further comprising:

determining whether a request has been received to respond to said request to initiate an instant messaging conversation; and in response to determining that said request has not been received within a predetermined amount of time, removing said notification window.

6. The method of claim 5, wherein removing said notification window comprises gradually removing said notification window and wherein gradually removing comprises causing the notification window to roll down from above a taskbar to behind the taskbar.

7. A computer-implemented method for providing a notification that an instant message (IM) has been received, the method comprising:

receiving the IM by an IM client application running on a computing device;

displaying in a graphical user interface (GUI) a top portion of a notification window above a taskbar, the notification window comprising an identification of an IM user that sent the IM and at least a portion of the IM;

displaying in the GUI a middle portion of the notification window above the taskbar; and displaying in the GUI a bottom portion of the notification window above the taskbar, wherein the top portion, the middle portion, and the bottom portion are sequentially displayed in a gradual manner, and wherein the notification window rolls up from the taskbar in an animated manner.

8. The computer-implemented method of claim 7, wherein said notification window is displayed proximate to an icon associated with the IM client application, and wherein said icon is displayed in the taskbar.

9. The computer-implemented method of claim 7, wherein said notification window is displayed proximate to an icon associated with the IM user and wherein said icon is displayed in the taskbar.

10. The computer-implemented method of claim 7, further comprising:

determining that the IM client application is not a visible window and not a foreground window; and displaying said notification window as a visible foreground window.

11. The computer-implemented method of claim 10 further comprising, scrolling said IM in an icon associated with the IM user, wherein said icon is displayed in the taskbar that is located proximate to an edge of a display screen and wherein scrolling comprises providing a quick view of the IM.

12. A method for providing notifications indicating that an instant message (IM) client application running on a computing device has received instant messages, the method comprising:

displaying in a graphical user interface (GUI) of the computing device a plurality of taskbar buttons along a taskbar, wherein each taskbar button of the plurality of taskbar buttons represents a respective IM conversation;

receiving by the IM client application the instant messages, wherein each instant message comprises at least part of a thread of a respective one of the respective IM conversations; and concurrently displaying a notification window above each taskbar button of the plurality of taskbar buttons, wherein each notification window is comprised of at least part of a respective instant message;

wherein each notification window is displayed above a taskbar button representing the respective IM conversation to which the respective instant message belongs; and wherein displaying the notification window comprises:

displaying in a graphical user interface (GUI) a top portion of the notification window above a taskbar, the notification window comprising an identification of an IM user that sent the IM and at least a portion of the IM;

displaying in the GUI a middle portion of the notification window above the taskbar; and displaying in the GUI a bottom portion of the notification window above the taskbar, wherein the top portion, the middle portion, and the bottom portion are sequentially displayed in a gradual manner, and wherein the notification window rolls up from the taskbar in an animated manner.

\* \* \* \* \*